(12) United States Patent
Schlicht

(10) Patent No.: US 6,469,473 B1
(45) Date of Patent: Oct. 22, 2002

(54) METHOD AND APPARATUS FOR USING PULSE CURRENT TO EXTEND THE FUNCTIONALITY OF A BATTERY

(75) Inventor: Michael Schlicht, San Jose, CA (US)

(73) Assignee: Battery Performance Technologies, Inc., Monte Sereno, CA (US)

( * ) Notice: Subject to any disclaimer, the term of this patent is extended or adjusted under 35 U.S.C. 154(b) by 0 days.

(21) Appl. No.: 09/811,109

(22) Filed: Mar. 16, 2001

(51) Int. Cl.[7] .................. H01M 10/44; H01M 10/46
(52) U.S. Cl. .......................... 320/131; 320/135
(58) Field of Search ........................ 320/127, 129, 320/131, 135, 139, 141

(56) References Cited

U.S. PATENT DOCUMENTS

| 3,808,487 | A |   | 4/1974  | Feullade           |
|-----------|---|---|---------|--------------------|
| 4,385,269 | A | * | 5/1983  | Aspinwall et al.   |
| 4,740,739 | A |   | 4/1988  | Quammen et al.     |
| 4,829,225 | A |   | 5/1989  | Gali               |
| 5,063,341 | A |   | 11/1991 | Gali               |
| 5,179,335 | A |   | 1/1993  | Nor                |
| 5,256,957 | A |   | 10/1993 | Wiesspeiner        |
| 5,307,000 | A |   | 4/1994  | Podrazhansky et al.|
| 5,334,925 | A |   | 8/1994  | Kendrick           |
| 5,463,304 | A |   | 10/1995 | Winters            |
| 5,479,084 | A |   | 12/1995 | Satsuma et al.     |
| 5,491,399 | A |   | 2/1996  | Gregory et al.     |
| 5,525,892 | A |   | 6/1996  | Phommarath         |
| 5,561,360 | A |   | 10/1996 | Ayres et al.       |
| 5,600,227 | A |   | 2/1997  | Smalley            |
| 5,629,600 | A |   | 5/1997  | Hara               |
| 5,633,574 | A |   | 5/1997  | Sage               |
| 5,648,701 | A |   | 7/1997  | Eryou et al.       |
| 5,652,497 | A |   | 7/1997  | Boivie             |
| RE35,643  | E |   | 10/1997 | Gali               |
| 5,714,865 | A |   | 2/1998  | Thomas             |
| 5,777,456 | A |   | 7/1998  | Kern               |
| 5,905,363 | A |   | 5/1999  | Helbing et al.     |
| 5,998,968 | A |   | 12/1999 | Pittman et al.     |
| 6,023,149 | A |   | 2/2000  | Pizzi              |
| 6,097,172 | A |   | 8/2000  | PodraZhansky et al |
| 6,100,668 | A | * | 8/2000  | Takano             |
| 6,118,275 | A |   | 9/2000  | Yoon et al.        |
| 6,130,522 | A |   | 10/2000 | Makar              |

* cited by examiner

Primary Examiner—Edward H. Tso
(74) Attorney, Agent, or Firm—Blakely Sokoloff Taylor & Zafman LLP

(57) ABSTRACT

A method to extend the functionality of a battery, the method comprising drawing power from the battery, and repetitively drawing a current pulse greater than the minimum conditioning current from the battery, thereby conditioning the battery.

26 Claims, 9 Drawing Sheets

Fig. 2
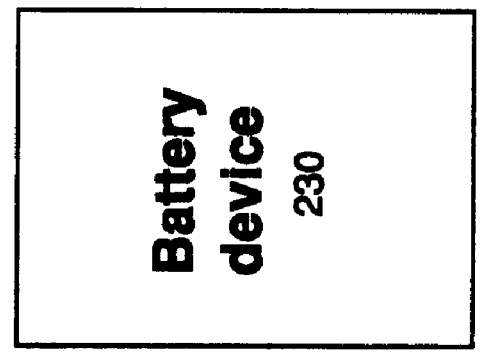
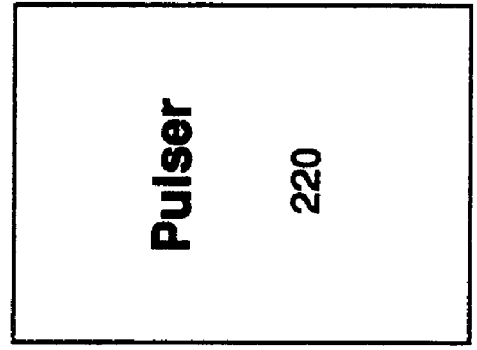
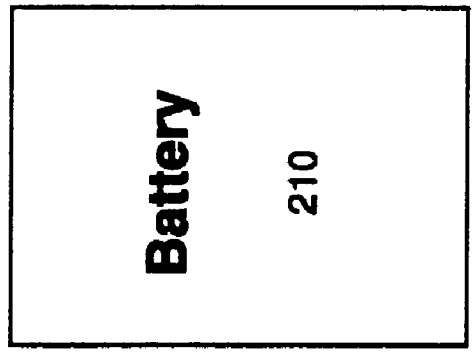

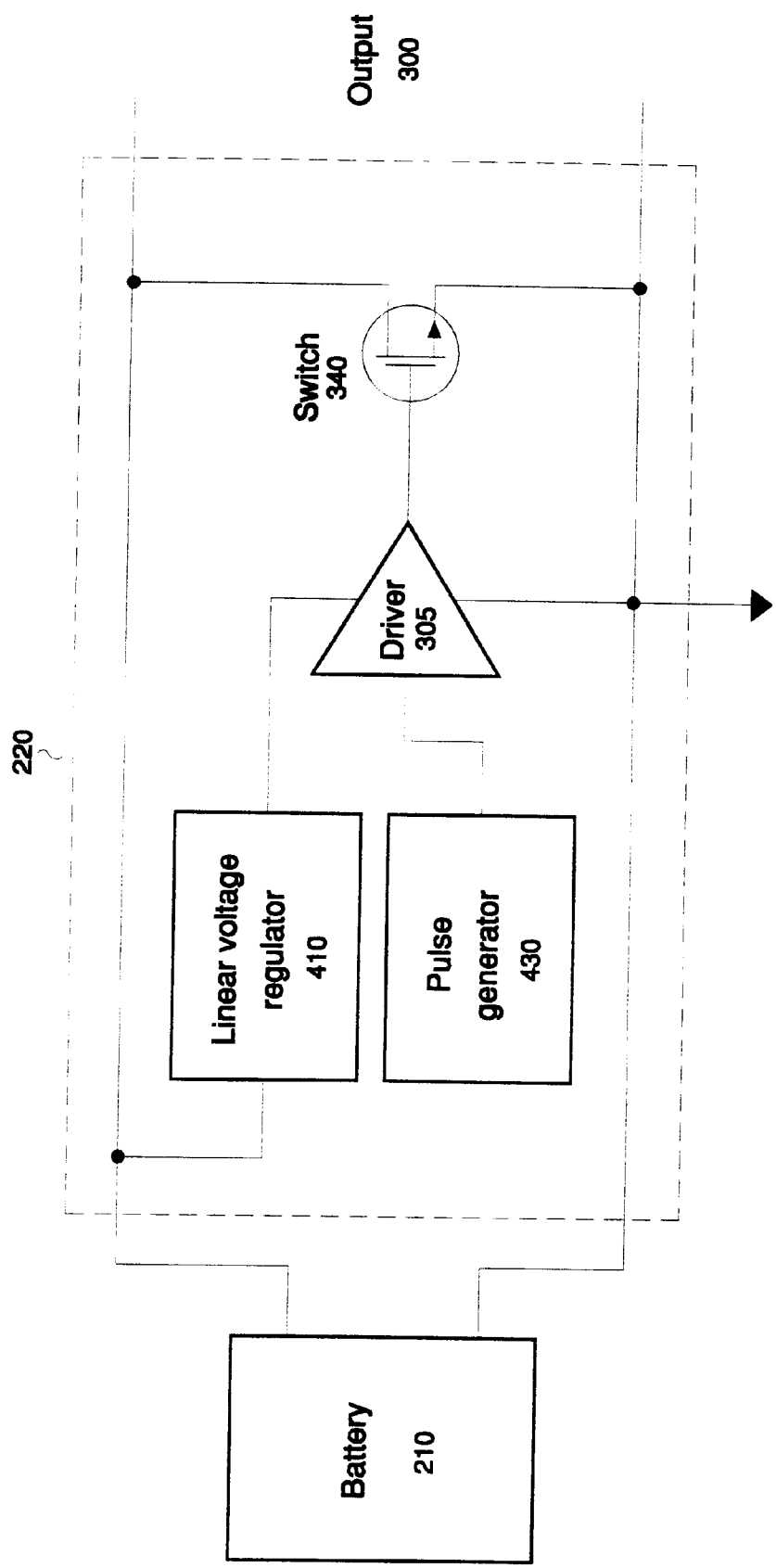

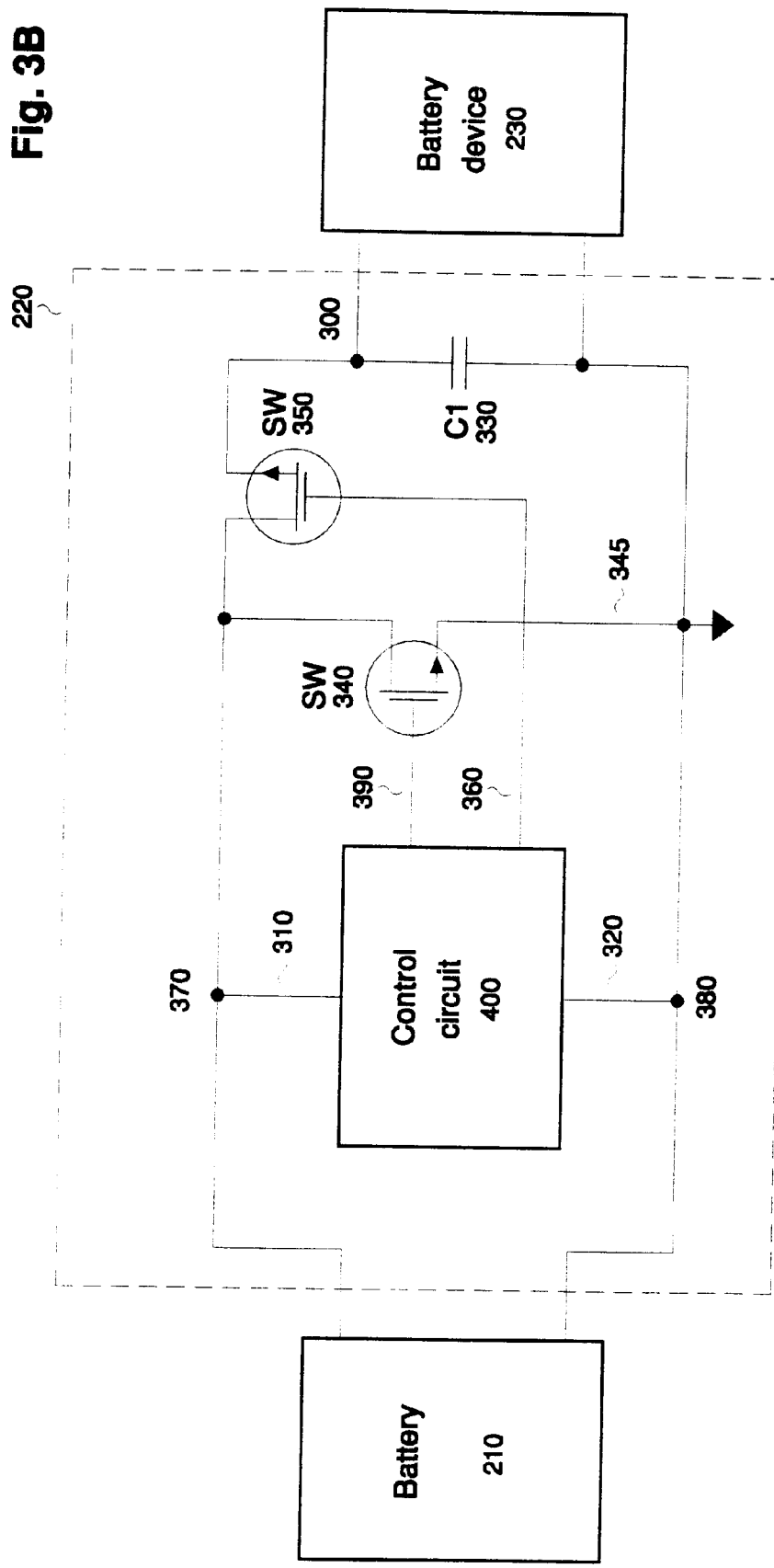

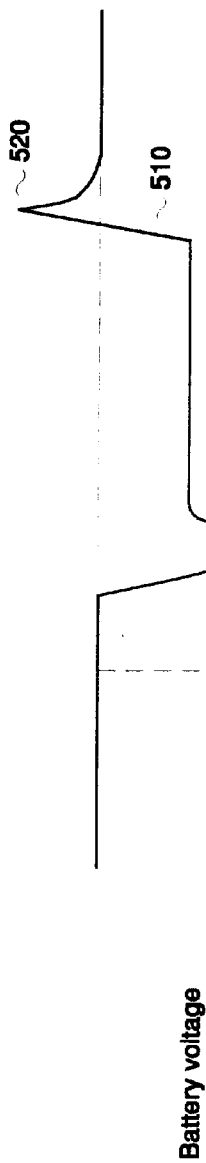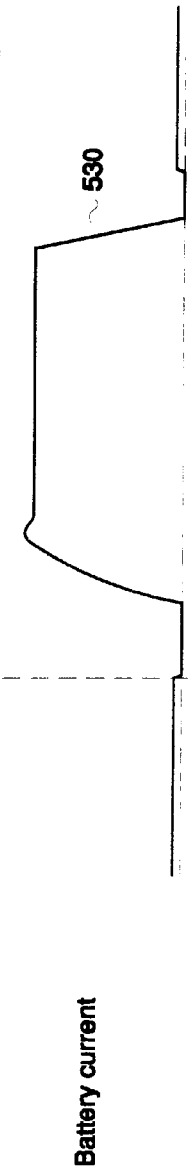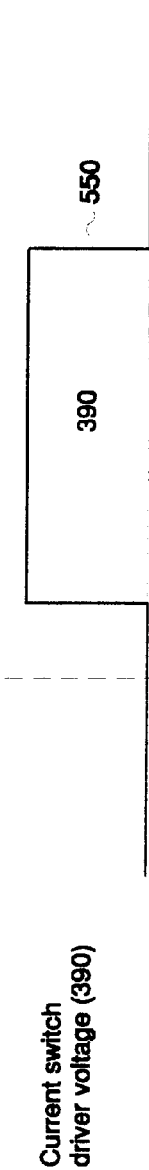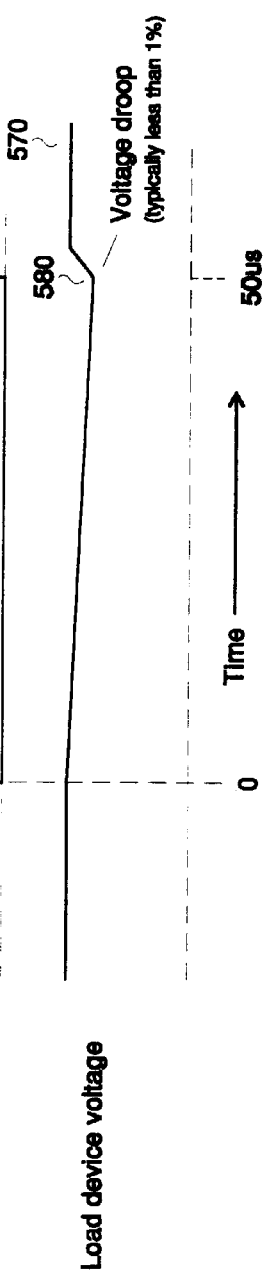

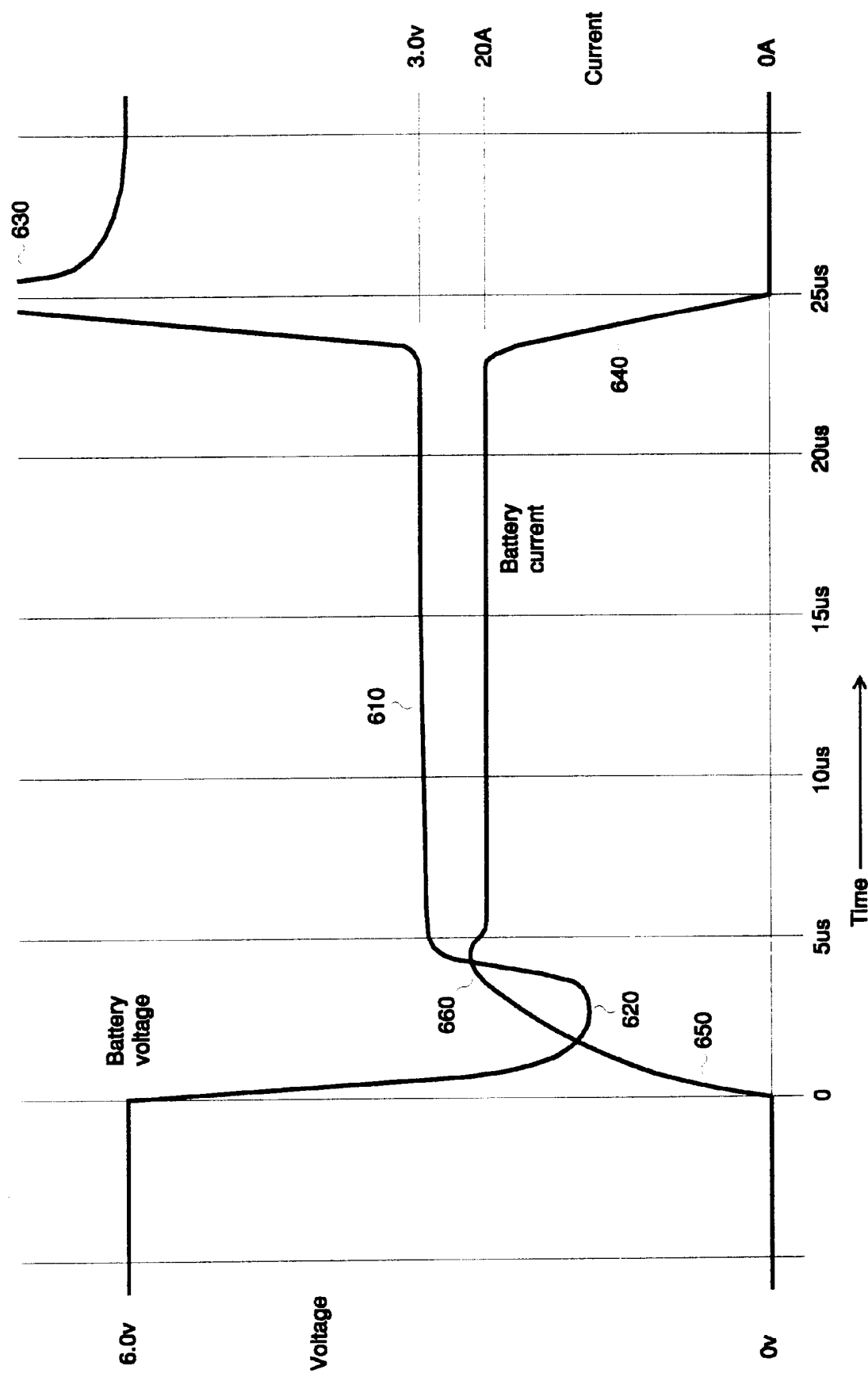

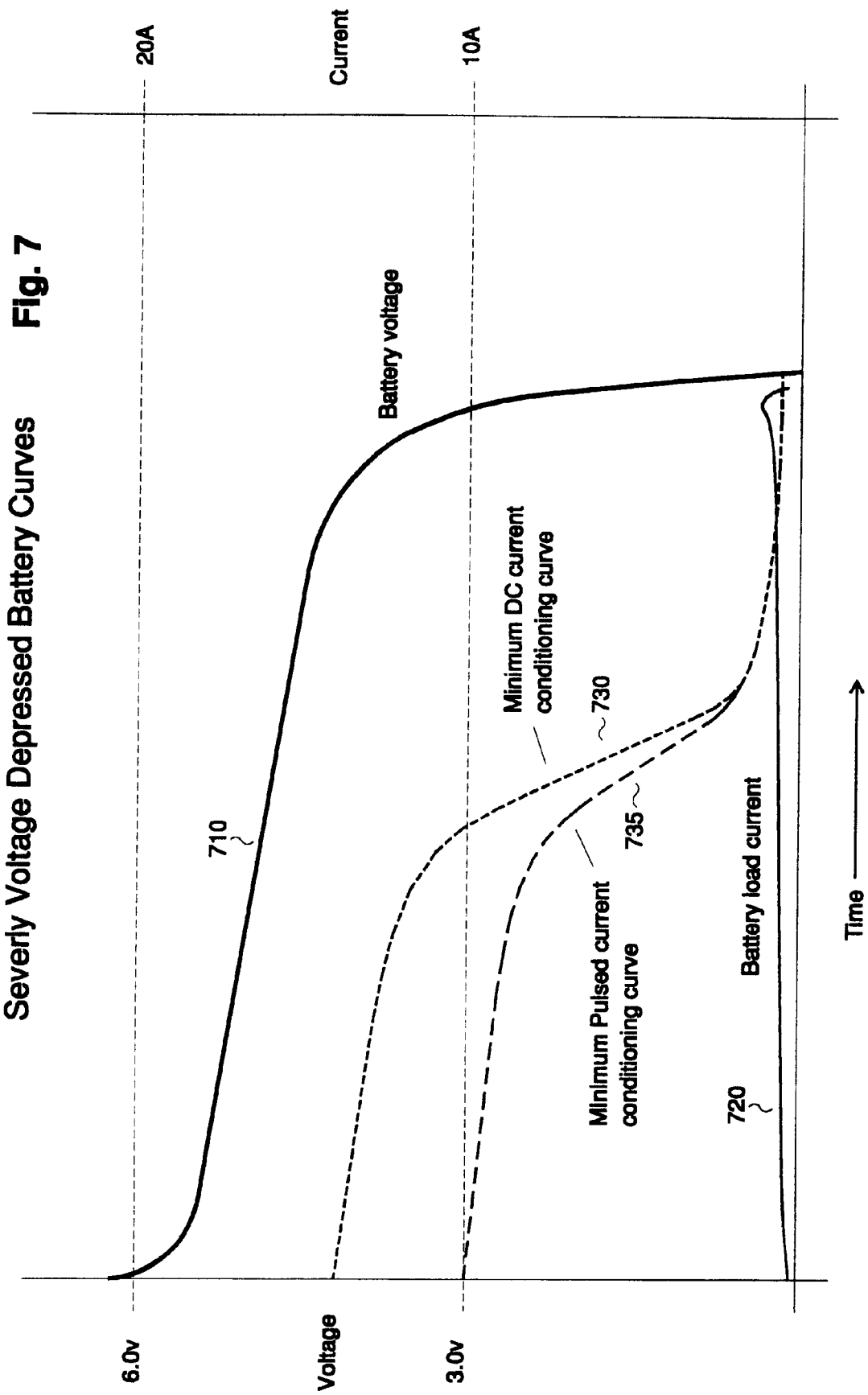

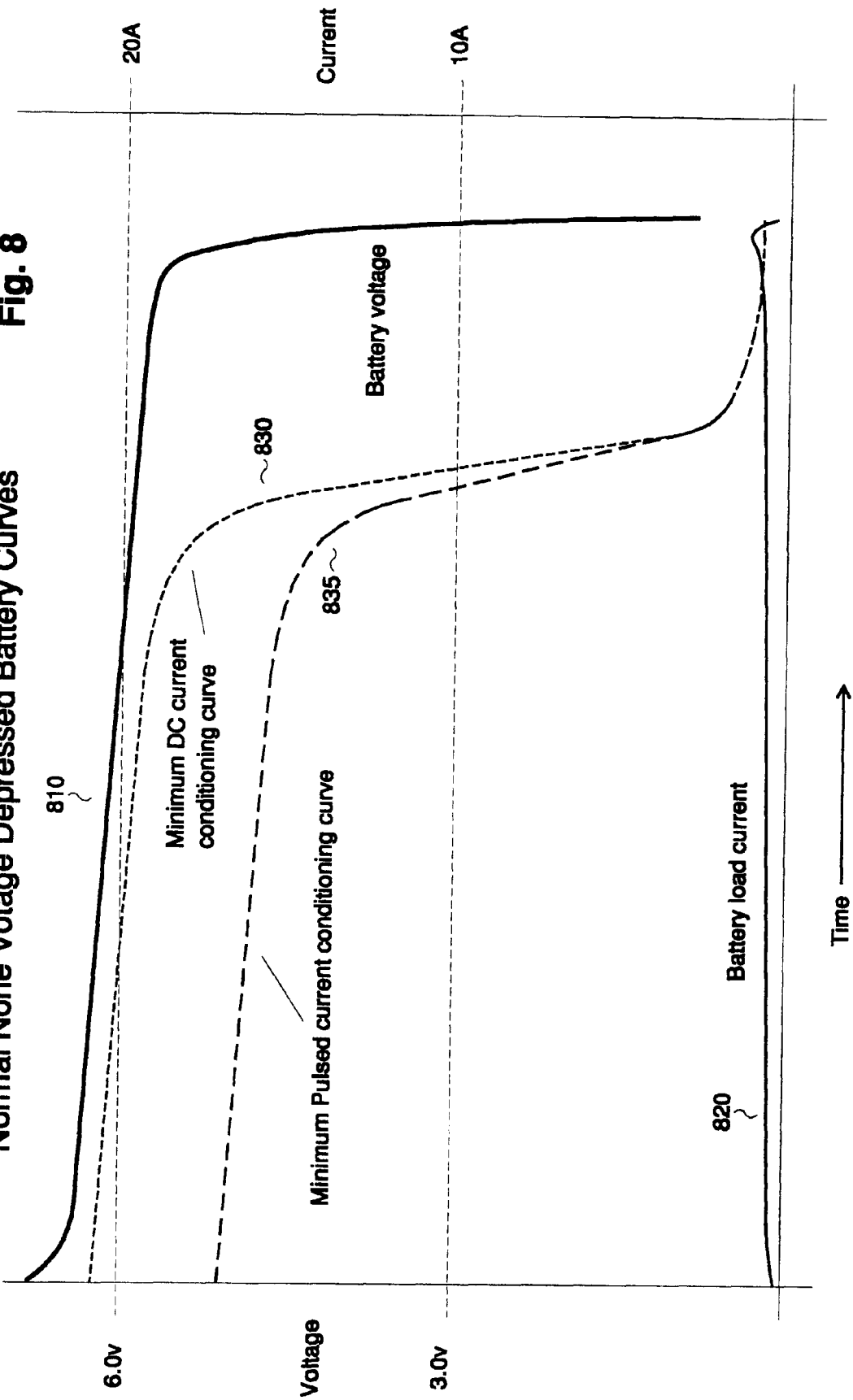

METHOD AND APPARATUS FOR USING PULSE CURRENT TO EXTEND THE FUNCTIONALITY OF A BATTERY

FIELD OF THE INVENTION

The present invention relates to batteries, and more specifically, to extending the functionality of a battery.

BACKGROUND

Batteries are used for many functions, to power portable computers, provide backup power, and power all types of portable devices. However, batteries have a limited lifetime. After a period of use, most rechargeable batteries develop "voltage depression," which results in the battery run-time decreasing after each recharge.

FIG. 1 illustrates a prior art voltage curve, for a new battery 110 and an old battery 120. The turn-off voltage 130 is set, for example for a camcorder, at a level below the level of the fully charged battery. Thus, a new battery, as can be seen, takes an hour to reach the turn-off voltage 130. However, an old battery 120 drops down more rapidly, to reach the turn-off voltage 130 after a mere 2.5 minutes. Thus, the old battery cannot be used to power devices, since the useable time is minimal.

The prior art to reduce the "memory" effect has been to deep discharge the batteries, typically at a current discharge rate well below the normal operating current level for a given application. Neither the battery run time or lifetime is enhanced by this. In addition, the standard practice of discharging a rechargeable battery down only to about 1.12 volts, which is considered the fully discharged level for new batteries, contributes directly to the battery "memory" phenomenon where older batteries have greatly reduced run time.

SUMMARY OF THE INVENTION

A method to extend the functionality of a battery, the method comprising drawing power from the battery, and repetitively drawing a current pulse greater than the minimum conditioning current from the battery, thereby conditioning the battery.

BRIEF DESCRIPTION OF THE DRAWINGS

The present invention is illustrated by way of example, and not by way of limitation, in the figures of the accompanying drawings and in which like reference numerals refer to similar elements and in which:

FIG. 2 is a diagram showing the pulser coupled to a device.

FIG. 3A is a block diagram of one embodiment of the pulser.

FIG. 3B is a block diagram of an alternate embodiment of the pulser.

FIGS. 5A–E are voltage and current diagrams of one embodiment of the response of the pulser.

FIG. 6 is an exemplary voltage and current diagram of an actual pulse response.

FIG. 7 is a diagram of the minimum conditioning current versus battery voltage and load current, for a severely voltage depressed system.

FIG. 8 is a diagram of the minimum conditioning current versus battery voltage and load current, for a new system.

DETAILED DESCRIPTION

Figure 1:
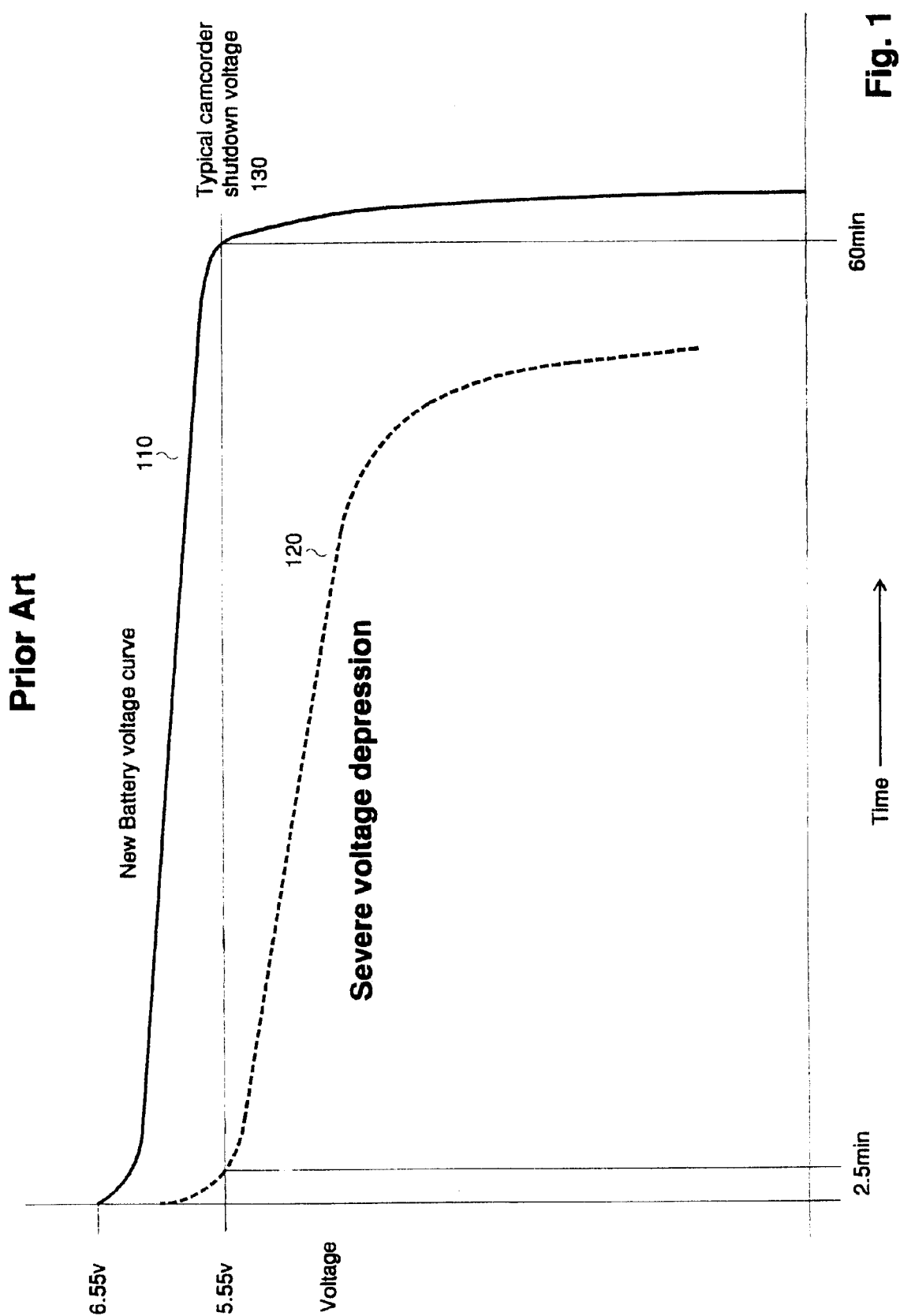
FIG. 1 is a voltage diagram of a prior art battery before use and after use.

A method and apparatus for extending battery functionality is described. By defining a conditioning curve, which is a level of current needed to condition the battery, the system can successfully condition batteries to eliminate voltage depression. This extends the functionality of the battery significantly.

The battery functionality for a rechargeable battery includes battery runtime, e.g. the time a single charge lasts, and useable battery lifetime, e.g. the number of times the battery may be recharged and have a useful discharge period. For the remainder of this application, the term "conditioning" or "conditioner" will be used, and should be understood to refer to extending the useable battery lifetime and/or runtime.

Using the pulser, which will be described in more detail below, the battery has close to an ideal discharge cycle that eliminates voltage depression and enhances the lifetime and runtime of the battery.

The rejuvenation zone, the level of current needed to condition the battery and extend its functionality, modulates depending on the state of the battery. The state of the battery includes the percentage of remaining charge in the battery, as well as the battery age and type. The minimum conditioning current needed for increasing the functionality of the battery decreases as the voltage level decreases. If the current being drawn from the battery is higher than this minimum conditioning current, the battery functionality is extended. This is referred to in this specification as "conditioning zone."

For many batteries the nominal current is a dose approximation of the optimum impedance matching point, where the battery voltage is reduced by 50%. For one embodiment, the power transfer is a function of the current density, which is cell size and battery type dependent. However, since current is difficult to measure, using the impedance matching point is an excellent, and easily measured, approximation. The actual minimum conditioning curve is battery age dependent. A typical curve for a voltage depressed battery is shown in FIG. 7, while a matching curve for a non-depressed battery is shown in FIG. 8.

In one embodiment, low duty-cycle high current load pulses throughout the discharge cycle pull current drawn from the battery above this minimum conditioning current level. These short duration pulses prevent voltage depression from occurring, and increase the functionality of the battery. Furthermore, the pulses do not reduce the runtime of the battery, since they are low duty cycle. For one embodiment, the duty cycle is typically less than 0.01%. The low duty cycle reduces the chances of overheating, or otherwise damaging the battery.

FIG. 2 is a diagram showing the battery pulser coupled to a device. The battery 210 is coupled to the device 230. The pulser 220 is coupled between the battery 210 and the device 230. For one embodiment, the pulser 220 is only coupled between the battery 210 and the device 230 for a short time, to condition the battery 210. After the battery functionality has been increased—for one embodiment one full charge cycle—the pulser 220 may be removed, until the battery's voltage depression again makes the use of the pulser 220 necessary. For another embodiment, the pulser 220 may be kept permanently between the battery 210 and the device 230.

For one embodiment, the battery 210 may be any type of battery. For example, the battery may be a nickel based battery, such as nickel cadmium or nickel metal hydride. For another embodiment, the battery may be a lead-acid battery. For yet another embodiment, the battery may be a lithium ion battery.

In an exemplary application, the pulser 220 is contained in a housing that is interposed between a Nickel Cadmium battery pack 210 and a device 230 such as a camcorder. The pulser 220 can be considered as an attachment to the battery pack 210 that maintains the battery 210 in optimal condition.

The output of the pulser 220 may be disconnected by a switch, such that the current switching induced voltage spikes do not reach the device 230, for one embodiment. For another embodiment, for a device that is insensitive to voltage variations, this switch may be eliminated, and the voltage may be directly passed to the device 230.

FIG. 3A is a block diagram of one embodiment of the pulser. The pulser shown is designed to be used with a device that is insensitive to voltage variations. For example, this may be the case for power tools that have an electric motor as a load. This design may also be used for systems in which the battery is not in use during the conditioning process. For example, the conditioning system may be implemented in a battery storage system, in which the battery is stored awaiting use.

FIG. 3B is a block diagram of one embodiment of the pulser. The pulser 220 includes a control circuit 400 coupled between the positive and negative poles of the battery. The control circuit 400, for one embodiment, has two outputs 360, 390. The first output 360 controls a first switch 350, while the second output 390 controls a second switch 340. The first switch 350 couples the power from the battery to a device output 300 to which a device 230 may be coupled. Thus, when the first output 360 is asserted, switch 350 connects the battery 210 and the device 230. When the first control circuit is deasserted, switch 350 disconnects the battery 210 from the device 230. During this time, capacitor 330 powers the device 230.

The second switch 340 couples the a controlled current from the output of battery 210 to ground 340. Thus, when switch 340 is on, the battery output goes to ground 345.

The control circuit 400 is designed to periodically draw a large controlled current from the battery 210. The level of the current is designed to be greater than the minimum conditioning current, which will be described below. For one embodiment, the current drawn during the pulse is sufficiently large to reduce the voltage from battery 210 to one half the normally drawn voltage. Thus, if the battery 210 normally provides 6 volts, during the current pulse the voltage provided by battery 210 is reduced to 3 volts.

For one embodiment, these current pulses have a short duty cycle, such that capacitor 330 can provide power to the output 300 during the time when the battery 210 cannot provide a stable voltage. FIG. 5 below illustrates in more detail the respective current and voltages, seen by the battery 210, the control circuit 400, and the output 300, i.e. a device coupled to the pulser 220.

For one embodiment, for circuits which are insensitive to voltage variations, such as power tools, the battery disconnect switch 350 may be eliminated.

Figure 4:
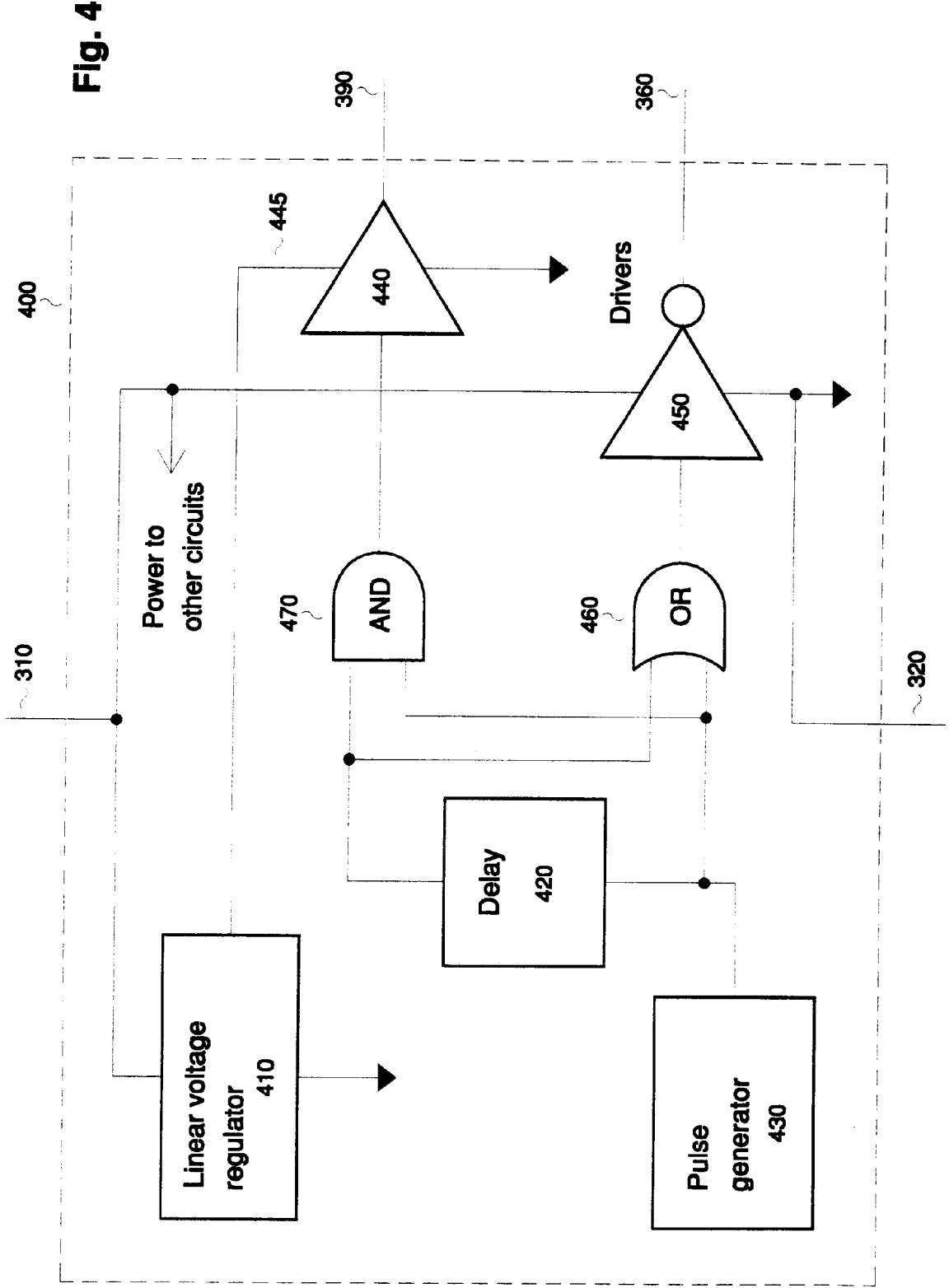
FIG. 4 is a more detailed block diagram of one embodiment of the control circuit of the pulser.

FIG. 4 is a more detailed block diagram of one embodiment of the control circuit 400. The control circuit 400 includes a voltage regulator 410, to set the FET switch 340 gate on-state voltage level, which determines the current pulse level. The voltage regulator 410 has as an input the output of the battery. The output of linear voltage regulator 410 is coupled to driver 440. Driver 440, for one embodiment, uses complimentary P-channel and N-channel FETs (CMOS) in its output. When driver 440 is asserted, the internal P-channel FET is on, and connects the output of the voltage regulator 445 to the gate of switch 340. The P-channel FET has a sufficiently low ON resistance to insure that there is virtually zero voltage drop across it, thus guaranteeing that the linear regulator 410 output voltage 445 is accurately impressed on the gate of switch 340.

The battery output is coupled to inverter 450.

The control circuit 400 further includes a pulse generator 430. The pulse generator 430 is responsible for generating the current pulse, as well as a blocking pulse, as will be described below. Pulse generators 430 are known in the art.

The output of pulse generator 430 is input to a logical OR 460, a logical AND 470, and a delay 420. The logical OR 460 drives signal 360, while the logical AND 460 drives signal 390. As described above, signal 360 controls switch one, while signal 390 controls switch two.

The output of delay 420 is the second input into logical OR 460 and logical AND 470. The output of logical OR 460 drives inverter 450, while the output of local AND 470 drives driver 440. Thus, when both the delay 420 and pulse generator 430 are on, signal 390 is asserted (one). When either the pulse generator 430 or the delay 420 is on, signal 360 is asserted (zero). Thus, signal 360 starts earlier, by the delay, and ends later by the delay, than signal 390. FIGS. 5A–E clarify these signal relationships.

As stated previously, the linear voltage regulator 410 in FIG. 4 is used to set the current pulse level. The drain/source current of switch 340 is primarily determined by the transconductance of the FET and the gate to source voltage. By varying the driver voltage 445, the gate voltage of the FET is varied, and the drain/source current of switch 340 will vary in proportion to the gate voltage.

For one embodiment, for circuits which are insensitive to voltage variations, such as power tools, the delay logic, the AND logic, the OR logic, and the driver 450 may be eliminated. Then, the pulses generated by pulse generator 430 may be directly coupled to the output, without isolating the device. In that case, the device sees the voltage spike at the end of the current pulse, as well as the lowered voltage. If the device is not damaged by such variations in voltage, the circuit may be substantially simplified.

FIGS. 5A–E are voltage and current diagrams of one embodiment of the response of the pulser. FIGS. 5A–E illustrate a single current pulse, and the various responses to the current pulse. Typically, the pulse frequency is between 100 pulses per second and 1 pulse per minute.

FIG. 5B illustrates the battery current being drawn from the battery during the pulse. Note that the pulse has a slew rate—the slope of the pulse as it rises and falls—and is not perfectly rectangular. The slew rate effects the overshoot 520 that is shown in the battery voltage, FIG. 5A.

For one embodiment, the pulse lasts approximately 25 $\mu$s. For one embodiment, the pulse may be between 1 $\mu$s and 500 $\mu$s. Note that other pulse widths may be used. Typically, pulse widths of over 500 $\mu$s cause voltage droop and internal heating in FET 340, which may raise the junction temperature above the safe limit. Typically, pulse widths under 5 $\mu$s require such a high slew rate that the overshoot 520 becomes too large. Thus, generally, the pulse rate is between 5 $\mu$s and 500 $\mu$s. Note that the pulse width controls the amount of power transferred into the battery. The amount of power needed for conditioning depends on the battery type and the cell size.

FIG. 5A illustrates the battery voltage. As can be seen, the battery voltage is significantly reduced during the current pulse. For one embodiment, by decreasing the slew rate of the battery current 530, the voltage spike 520 is reduced.

The current switch drive 550, FIG. 5C, corresponds to signal 390, which indicates when battery current 530 starts to rise, and starts to fall. Current switch drive 390 pulls the current pulse from the battery.

The battery disconnect switch drive 560, FIG. 5D corresponds to signal 360. As can be seen, the signal 560 starts prior to the current switch drive 550, and ends after the current switch drive 550. While the battery disconnect switch drive 560 is active (e.g. low), the battery is disconnected from a device coupled to the pulser. For one embodiment, the delay before and the delay after the current switch drive 550 is identical, and determined by the delay set by delay unit 420.

Load device voltage 570, in FIG. 5E, is the voltage seen by a device coupled to the pulser. As can be see, when battery disconnect switch drive 560 is active, the battery is disconnected from the device, and the load device voltage 570 starts to slowly drop. The capacitor, resisting the change in voltage, maintains the voltage, and thus the voltage level sinks slowly. When the battery disconnect switch drive 560 is turned off, effectively reconnecting the battery and the device, the voltage level increases to the previous level.

Note that the battery voltage spike 520 is not seen by the load device voltage 570, because the battery disconnect switch drive 560 disconnects the battery from the device, during the spike 520. For one embodiment, there may be a very small spike.

For one embodiment, the capacitor is sized such that the voltage droop 580 is minimized. For one embodiment, the voltage droop 580 is less than 1%. Thus, the device is not affected by the current pulse.

For one embodiment, for circuits which are insensitive to voltage variations, such as power tools, the battery may remain coupled to the device, and the voltage levels seen by the device would be battery voltage 510, including spikes 520.

FIG. 6 is an exemplary voltage and current diagram of an actual pulse response. The voltage and current levels indicated are exemplary. As can be seen, the current increases for 4 μs to 20 Amperes. The current 650 may overshoot 660 slightly, which has no negative effect.

The battery voltage 610 decreases correspondingly, due to the internal resistance of the battery. For one embodiment, the current 650 is increased to drop battery voltage 610 to half its previous value. By decreasing the voltage 610 to half its previous value—3 volts from 6 volts in this example—there is an impedance match between the battery and the pulser.

The battery voltage 610 undershoots 620 slightly when the current pulse is first started. For one embodiment, the undershot 620 is a result primarily of internal battery capacitance, and other factors.

At the end of the pulse, there is a large battery voltage overshoot 630. The amplitude of the battery overshoot 630 may be controlled by altering the slew rate at which the current turns off. If the slew rate is decreased (e.g. slope 640 is made gentler, the amplitude of the voltage overshoot 630 may be decreased. This may be useful for devices that are very sensitive to voltage variations. Note, however that for one embodiment the battery voltage 610, at the time of the overshoot 630, is isolated from any device coupled to the pulser, as was described above.

FIG. 7 is a diagram of the minimum conditioning current curves versus battery voltage and load current, for a highly voltage depressed battery system. Note that this Figure does not illustrate the pulses described above. It shows the relationship of the minimum conditioning currents 730, 735 with respect to battery voltage 710. As can be seen, when the battery is fully charged, the minimum conditioning currents 730, 735 are quite high, a large multiple of the standard battery load current 720. Therefore, the current pulses must be large, compared to the standard load current.

The minimum DC current conditioning curve 730 illustrates the conditioning current needed, if a steady current were being pulled from the battery. The pulsed current conditioning curve 735 illustrates the current levels needed for conditioning when the current is pulled from the battery using current pulses, as described above. As can be seen, the DC conditioning curve 730 requires higher currents than the pulsed conditioning curve 735. This is the result of the slew rate effect. Rapidly increasing and decreasing currents have a larger effect than a steady current. Thus, because the conditioning current is pulsed, rather than pulled as a steady DC current, a lower current level, and therefore less power, needs to be pulled from the battery to effect conditioning.

Compare this to FIG. 8, illustrating a similar battery's rejuvenation curve, if the battery does not suffer from voltage depression. As can be seen, the minimum DC current conditioning curve 830 and minimum pulsed conditioning curve 835 retain their relationship to each other. However, both are considerably higher in a new battery than in a voltage depressed battery.

Thus, a prior art device that is unaware of the conditioning curve, may accidentally hit the conditioning current level, for a severely voltage depressed battery. However, as the battery becomes rejuvenated or conditioned, the conditioning curve moves up, requiring higher and higher currents. Thus, without awareness of the battery condition-dependence of the conditioning curves, prior art devices could not consistently condition batteries. They may ride the conditioning curve, hitting it occasionally as the battery becomes more voltage depressed. However, the battery is never fully rejuvenated using this method.

The system described conditions the battery, by using short, repeated, current pulses. For one embodiment, the current pulses are periodic, e.g. every 10 seconds. For another embodiment, the current pulses may occur at irregular intervals. However, repeated pulses are used, above the minimum conditioning current level. For one embodiment, the current pulses are designed to reduce the battery voltage, during the duration of the pulse, to half its normal value. This provides an impedance matching, which has been shown to be most effective for the batteries tested. During the current pulse, while the battery voltage is reduced, for one embodiment, the battery voltage is disconnected from any device coupled to the battery and pulser. A capacitor or similar system provides power for a device coupled to the battery during this time. For one embodiment, the battery is disconnected a slight time interval before, and disconnected a small time interval after the current pulse. This prevents the voltage spike that occurs at the end of the current pulse from affecting the device.

Note that although the above description states that the battery may be in use during this conditioning process, it need not be in use. This conditioning may be done when the battery & pulser are not coupled to any device. In that case, for one embodiment, the simplified system, described above as FIG. 3A may be used, and the disconnection logic may be eliminated.

For one embodiment, the battery may be conditioned 100%, at which point the battery behaves like a new battery. However, in some cases, the battery may be partially damaged, or otherwise unable to be fully conditioned. For example, if a battery has certain irreparable damage, some portion of the battery may not be conditionable. However, certain types of damage may be repaired using the above conditioning technique. For example, damaged cells may be restored, since the high current pulses have the effect of reducing internal shorts, and in some cases eliminating them.

Thus, a typical conditioning may maintain the battery at 95% effectiveness, for example. For one embodiment, the typical conditioning results vary by battery type, as well as the type of use that was made of the battery. For example, a camcorder battery may have a lower level of conditioning if the battery has been left discharged for an extended time, or if the battery has been stored in an excessively hot location, leading to battery damage.

Note that the voltages and current levels provided in FIGS. 5, 6, 7, and 8 are exemplary, based on the expected results derived from experiments using 1000 mA/hour rechargeable NiCad batteries. It is to be understood that other batteries would have similar, but not identical curves.

In the foregoing specification, the invention has been described with reference to specific exemplary embodiments thereof. It will, however, be evident that various modifications and changes may be made thereto without departing from the broader spirit and scope of the invention as set forth in the appended claims. The specification and drawings are, accordingly, to be regarded in an illustrative rather than a restrictive sense.

What is claimed is:

1. A method of conditioning a battery while discharging the battery, the method comprising:
    drawing power from the battery;
    repetitively drawing a current pulse greater than the minimum conditioning current from the battery, thereby conditioning the battery.

2. The method of claim 1, wherein the minimum conditioning current is a function of the battery power remaining in the battery, and decreases as a function of a decrease of the battery voltage.

3. The method of claim 2, further comprising calculating the minimum conditioning current, comprising:
    drawing a first current level from the battery at a first battery power;
    determining whether a conditioning effect has been observed; and
    if the conditioning effect has been observed, determining that the first current level is at least at the minimum conditioning current.

4. The method of claim 1, wherein a pulse width is between 5 $\mu$s and 500 $\mu$s.

5. The method of claim 1, wherein a pulse frequency is between 100 pulses per second and 1 pulse per minute.

6. The method of claim 1, wherein the pulse occurs at irregular intervals.

7. The method of claim 1, wherein the battery is used to drive a device, while the current pulses are being drawn.

8. The method of claim 1, further comprising:
    isolating a device coupled to the battery from a voltage dip in response to the current pulse.

9. The method of claim 8, wherein the device is powered from an alternative power source while the current pulse is being drawn from the battery.

10. The method of claim 9, wherein the alternative power source is a capacitor, and wherein the capacitor is charged by the battery.

11. A method of conditioning a battery to eliminate voltage depression, the method comprising:
    coupling a pulser between the battery and a device during use of the battery, the pulser repetitively drawing a current pulse greater than the minimum conditioning current from the battery, thereby conditioning the battery; and
    removing the pulser from between the battery and the device after a period of time, the battery having been conditioned during this process such that the in-use time of the battery corresponds to the in-use time of the new battery.

12. The method of claim 11, wherein the period of time depends on an initial condition of the battery, such that less time is needed to condition a fairly new battery compared to an old battery.

13. The method of claim 12, wherein the period of time ranges from a few minutes to multiple discharge cycles.

14. The method of claim 11, wherein the battery is a rechargeable nickel cadmium (NiCad) battery.

15. An apparatus to improve functionality of a battery comprising:
    a pulser to repetitively draw a current pulse greater than a minimum conditioning current from the battery, thereby conditioning the battery.

16. The apparatus of claim 15, wherein the minimum conditioning current is function of the battery power, and decreases as a function of a decrease of the battery voltage.

17. The apparatus of claim 16, wherein the pulser comprises:
    a pulse generator to generate current pulses; and
    such that a battery voltage is reduced to half its normal value.

18. The apparatus of claim 17, further comprising:
    a switch to disconnect the pulser from a device coupled to the battery while the voltage is reduced; and
    a secondary power source to power the device during the pulse.

19. The apparatus of claim 18, wherein the secondary power source comprises a capacitor.

20. The apparatus of claim 15, further comprising:
    a delay logic to disconnect the pulser from the device prior to the pulse, and to recouple the battery to the device after a voltage spike.

21. An apparatus to condition a rechargeable battery during use comprising:
    a pulse generator powered by the battery;
    a control circuit for switching the pulse generator into the circuit periodically, to permit the pulse generator to repetitively draw a current pulse greater than the minimum conditioning current from the battery, thereby conditioning the battery.

22. The apparatus of claim 21, wherein the battery is a rechargeable nickel cadmium (NiCad) battery.

23. The apparatus of claim 21, further comprising:
    a second switch to decouple the pulse generator an output of the apparatus, such that a device coupled to the output of the apparatus is not affected by a voltage dip as a result of the current pulse.

24. The apparatus of claim 23, further comprising:
    a delay logic to decouple the pulse generator prior to the current pulse, and to recouple the pulse generator after a delay, such that a voltage spike resulting from a decrease in the current after the current pulse does not affect the device.

25. The apparatus of claim 21, wherein the control circuit comprises:
 a first driver controlling the first switch, the first driver controlled by the pulse generator, the first driver disconnecting the pulse generator from an output of the apparatus during the pulse; and
 a second driver controlling a second switch to couple a capacitor to the output of the apparatus during the pulse, such that the capacitor provides power to a device coupled to the output of the apparatus.

26. A method of conditioning a battery while discharging the battery, the method comprising:
 drawing a first current level and a first voltage level from the battery;
 drawing a current pulse at least ten times the first current level from the battery;
 such that the voltage provided by the battery during the current pulse is one half the first voltage level.

* * * * *